US007157283B2

(12) United States Patent
Nelson et al.

(10) Patent No.: US 7,157,283 B2
(45) Date of Patent: Jan. 2, 2007

(54) CONTINUOUS PROCESS FOR THE PRODUCTION OF COMBINATORIAL LIBRARIES OF MODIFIED MATERIALS

(75) Inventors: James M. Nelson, Roseville, MN (US); Ryan E. Marx, Cottage Grove, MN (US); Jeffrey J. Cernohous, Hudson, WI (US); James R. McNerney, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 623 days.

(21) Appl. No.: 10/211,219

(22) Filed: Aug. 2, 2002

(65) Prior Publication Data

US 2004/0023398 A1    Feb. 5, 2004

(51) Int. Cl.
G01N 31/10 (2006.01)
(52) U.S. Cl. .................. 436/37; 422/135; 422/138
(58) Field of Classification Search ................ 422/135, 422/138; 436/37
See application file for complete search history.

(56) References Cited

U.S. PATENT DOCUMENTS

| | | | |
|---|---|---|---|
| 2,915,554 A | 12/1959 | Ahlbrecht et al. | |
| 3,036,997 A * | 5/1962 | Campbell | 525/455 |
| 3,687,422 A | 8/1972 | List | |
| 3,689,035 A | 9/1972 | List | |
| 3,778,393 A * | 12/1973 | Greber | 525/54.3 |
| 3,880,407 A | 4/1975 | List | |
| 4,039,024 A | 8/1977 | List | |
| 4,086,151 A * | 4/1978 | Stevens et al. | 528/103 |
| 4,172,859 A | 10/1979 | Epstein | |
| 4,415,615 A | 11/1983 | Esmay et al. | |
| 4,500,687 A * | 2/1985 | Wolfe | 525/412 |
| 4,533,482 A | 8/1985 | Bollinger | |
| 4,572,819 A | 2/1986 | Priddy et al. | |
| 4,820,778 A | 4/1989 | Ohtani et al. | |
| 4,948,832 A | 8/1990 | Ostermayer et al. | |
| 4,985,486 A | 1/1991 | Westeppe et al. | |
| 5,002,676 A | 3/1991 | Willis et al. | |
| 5,112,918 A | 5/1992 | Boocock et al. | |
| 5,122,571 A | 6/1992 | Westeppe et al. | |
| 5,144,069 A | 9/1992 | Stern et al. | |
| 5,225,496 A | 7/1993 | Yamamoto et al. | |
| 5,227,460 A | 7/1993 | Mahabadi et al. | |
| 5,256,489 A | 10/1993 | Maringer et al. | |
| 5,338,802 A | 8/1994 | DuBois et al. | |
| 5,374,688 A | 12/1994 | Besecke et al. | |
| 5,571,655 A | 11/1996 | Mahabadi et al. | |
| 5,644,007 A | 7/1997 | Davidson et al. | |
| 5,804,625 A | 9/1998 | Temperante et al. | |
| 6,121,479 A | 9/2000 | Mullner et al. | |
| 6,160,054 A | 12/2000 | Schwindeman et al. | |
| 6,184,338 B1 | 2/2001 | Schwindeman et al. | |
| 6,197,891 B1 | 3/2001 | Schwindeman et al. | |
| 6,221,991 B1 | 4/2001 | Letchford et al. | |
| 6,319,881 B1 | 11/2001 | Coolbaughh et al. | |
| 6,350,820 B1 | 2/2002 | Hahnfeld et al. | |
| 6,448,353 B1 | 9/2002 | Nelson et al. | |
| 6,586,541 B1 | 7/2003 | Citron | |
| 6,613,870 B1 | 9/2003 | Harder et al. | |
| 6,649,719 B1 | 11/2003 | Moore et al. | |
| 6,737,026 B1 | 5/2004 | Bergh | |
| 6,749,814 B1 | 6/2004 | Bergh | |
| 6,852,781 B1 | 2/2005 | Savu et al. | |
| 6,890,493 B1 | 5/2005 | Bergh | |
| 6,902,934 B1 | 6/2005 | Bergh | |
| 2001/0027234 A1 | 10/2001 | Binder et al. | |
| 2002/0010267 A1 | 1/2002 | Klaerner et al. | |
| 2002/0160527 A1 | 10/2002 | Cernohous et al. | |
| 2002/0170976 A1 | 11/2002 | Bergh | |
| 2003/0035917 A1* | 2/2003 | Hyman | 428/67 |
| 2003/0236369 A1* | 12/2003 | Komoriya et al. | 526/246 |
| 2004/0023398 A1 | 2/2004 | Nelson et al. | |

FOREIGN PATENT DOCUMENTS

| | | |
|---|---|---|
| EP | 0 603 965 A2 | 6/1994 |
| WO | WO 96/07522 | 3/1996 |
| WO | WO 96/07674 | 3/1996 |
| WO | WO 97/40929 | 11/1997 |
| WO | WO 01/58962 A1 | 8/2001 |
| WO | WO 02/081079 | 10/2002 |

OTHER PUBLICATIONS

Article: Busse et al., "Synthesis of Amphiphilic Block Copolymers Based on tert-Butyl Methacrylate and 2-(N-Methylperfluorobutanesulfonamido)ethyl Methacrylate and Its Behavior in Water," *Macromolecules*, vol. 35, No. 1, (2002), pp. 178-184.
Example: "Reactive Compounding," (date unknown but prior to filing date of present application), 1 page.
Literature Examples: Baker et al., "PS/PE Blend," *Polymer*, vol. 28, (1987), p. 2057.
Literature Examples: Hobbs et al., "PE/PA 6,6 Blend," *Polym. Eng. Sci.*, vol. 23, (1983), p. 380.

(Continued)

*Primary Examiner*—Jill Warden
*Assistant Examiner*—Natalia Levkovich
(74) *Attorney, Agent, or Firm*—Sean J. Edman

(57) ABSTRACT

A system is provided wherein a devolatilizing reactor is used to make combinatorial libraries of materials. Examples of suitable reactors include continuous high viscosity devolatilizers and continuous devolatilizing kneaders.

25 Claims, No Drawings

OTHER PUBLICATIONS

Literature Examples: "EPDM/PBT Blend," U.S. Patent No. 4,172,859, (date unknown but prior to filing date of present application), 1 page.

Information: "ReactiveProcessing of PS-Co-maleic anhydride/Elastomer Blends," (date unknown but prior to filing date of present application), p. 1077.

Article: Guegan et al., "Anionic Synthesis, Modification, and Characterization of ABC Triblock Copolymers," *Macromolecules*, vol. 29, No. 13, (1996), pp. 4605-4612.

Article: Barclay et al., "The 'Living' Free Radical Synthesis of Poly(4-hydroxystyrene): Physical Properties and Dissolution Behavior," *Macromolecules*, vol. 31, No. 4, (1998), pp. 1024-1031.

Article: Yang et al., "Clustering of Poly(methacrylic acid) around Appended Binaphthyl Labels as Reflected by the Disruption of γ-Cyclodextrin Complexation and Racemization Kinetics," *Macromolecules*, vol. 32, No. 8, (1999), pp. 2577-2584.

Article: Leyh et al., "Shear-Induced Order in Aqueous Micellar Solutions of Amphiphilic Poly(*tert*-butylstyrene)-*b*-poly(Na methacrylate) Diblock," *Macromolecules*, vol. 31, No. 26, (1998), pp. 9258-9264.

Article: Creutz et al., "Efectiveness of Poly(vinylpyridine) Block Copolymers as Stabilizers of Aqueous Titanium Dioxide Dispersions of a High Solid Content," *Langmuir*, vol. 15, No. 21, (1999), pp. 7145-7156.

Article: Wang et al., "Synthesis of AB(BA), ABA and BAB Block Copolymers of *tert*- Butyl Methacrylate (A) and Ethylene Oxide (B)," *Journal of Polymer Science: Part A: Polymer Chemistry*, vol. 30, (1992), pp. 2251-2261.

Article: Huang et al., "Hydrogel-Coated Glassy Nanospheres: A Novel Method for the Synthesis of Shell Cross-Linked Knedels," *J. Am. Chem. Soc.*, vol. 119, No. 48, (1997), pp. 11653-11659.

Article: Lewandowski et al., "Polar, Monodisperse, Reactive Beads from Fuctionalized Methacrylate Monomers by Staged Templated Suspension Polymerization," *Chem. Mater.*, vol. 10, No. 1, (1998), pp. 385-391.

Article: Lai, "Thermal Behavior of Random Copolymers of Methacrylic and *tert*-Butyl Methacrylate," *Macromolecules*, vol. 17, No. 5, (1984), pp. 1010-1012.

Article: Peters et al., "Termination of Living Anionic Polymerizations Using Chlorosilane Derivatives: A General Synthetic Methodology for the Synthesis of End-Functionalized Polymers," *J. Am. Chem. Soc.*, vol. 117, No. 12, (1995), pp. 3380-3388.

Article: Moon et al., "Synthesis of *end*- and *mid*-Phthalic Anhydride Functional Polymers by Atom Transfer Radical Polymerization," *Macromolecules*, vol. 34, No. 23, (2001), pp. 7941-7951.

Product Information: "High Viscosity Processing Technology," LIST, Inc., (date unknown but prior to filing date of present application), pp. 4-1 to 4-2.

Article: Deporter et al., "Methacrylate-Based Block Ionomers I: Synthesis of Block Ionomers Derived from *t*-Butyl Methacrylate and Alkyl Methacrylates," *Polymer International*, vol. 33, No. 2, (1994), pp. 205-216.

Odian, George, "Principles of Polymerization," 3rd Edition, Ch. 3, John Wiley & Sons, Inc., New York, NY, 1991.

Greene, Theodora W. and Wuts, Peter G.M., "Protective Groups in Organic Synthesis," 2nd Edition, John Wiley & Sons, Inc., New York, NY, 1991, p. 41.

Greene, Theodora W. and Wuts, Peter G.M, "Protective Groups in Organic Synthesis," 2nd Edition, John Wiley & Sons, Inc, New York, NY, 1991, p. 80-83.

Hahn, Stephen F., "An Improved Method for the Diimide Hydrogenation of Butadiene and Isoprene Containing Polymers," Journal of Polymer Science—Part A: Polymer Chemistry, vol. 30, No. 3, 1992, p. 397.

Rachapudy, H. et al., "Properties of Amorphous and Crystallizable Hydocarbon Polymers. III. Studies fo the Hydrogenation of Polybutadiene," Journal of Polymer Science: Polymer Physics Edition, vol. 17, No. 7, 1979, p. 1211.

Fairley, Peter, "Symyx Makes 'Living' Block Copolymers," Chemical Week, vol. 161, No. 17, 1999, p. 13.

Barclay, G.G. et al., "The 'Living' Free Radical Synthesis of Poly(4-hydroxystyrene): Physical Properties and Dissolution Behavior," Macromolecules, vol. 31, No. 4, 1998, p. 1024.

Controlled/Living Radical Polymerization—Progress in ATRP, NMP, and RAFT, ACS Symposium Series 768, Krzysztof Matyjaszewski Edition, 2000, Title Page, Table of Contents and Publication Information.

U.S. Appl. No. 09/824,330, filed Apr. 2, 2001, A Continuous Process for the Production of Combinatorial Libraries of Materials.

U.S. Appl. No. 10/211,096, filed Aug. 2, 2002, Fluorinated Polymers.

U.S. Appl. No. 10/211,415, filed Aug. 2, 2002, Process to Modify Polymeric Materials and Resulting Compositions.

\* cited by examiner

CONTINUOUS PROCESS FOR THE PRODUCTION OF COMBINATORIAL LIBRARIES OF MODIFIED MATERIALS

FIELD OF THE INVENTION

The present invention relates to a continuous process for the production of combinatorial libraries of modified materials.

BACKGROUND INFORMATION

A combinatorial approach for materials synthesis is aimed at using rapid synthesis and screening methods to build libraries of polymeric, inorganic or solid state materials. For example, advances in reactor technology have empowered chemists and engineers to rapidly produce large libraries of discrete organic molecules in the pursuit of new drug discovery, which have led to the development of a growing branch of research called combinatorial chemistry. Robotic driven parallel synthesizers consisting of arrays of small batch type reactors have been designed for such efforts (e.g., Chemspeed, Endeavor, Neptune, FlexChem, Reacto-Stations). These reactors synthesize milligram to gram quantities of materials, which can rapidly be screened or analyzed by various techniques including gas chromatography, FT-IR, and UV-Visible spectroscopy.

The development and use of combinatorial methods to develop new polymeric materials is a topic of considerable current interest. A large portion of the current focus of this material-based research is the synthesis of block, graft, dendritic and functionalized polymers. For example, the production of copolymer emulsions at temperatures well below 100° C. in a batch combinatorial chemistry system capable of evaluating 1,000 polymers/week has recently been demonstrated (see Fairley, P., "Symyx Makes 'Living' Block Copolymer" Chemical Week 1999, 161, No. 17, 5th May, 1999, p. 13)

An important consideration in making these arrays is that batch reactors suffer from poor heat transfer characteristics, which may have a detrimental effect on the materials produced in batch arrays. In addition, materials produced in small batch reactors still need to be scaled to an appropriate level for application testing and product qualification, requiring some process development and scale up understanding.

SUMMARY OF THE INVENTION

There exists a need for a readily scalable, economical method that can rapidly produce many combinatorial formulations in quantities appropriate for application development. The present invention provides a new method of preparing combinatorial libraries of chemically-modified materials in a high throughput fashion. It allows for library members to be continuously made and collected. It also allows the option of later determining the starting materials for a member by tracing back to the time when the starting materials would have been input.

In one aspect the present invention provides a continuous method of making a combinatorial library of materials comprising providing a plug flow mixing apparatus having a high shear environment and devolatilization capabilities, continuously introducing into the mixing apparatus a composition containing at least one polymer that can be modified by a thermally-induced reaction into the reactor, exposing the composition to a high shear environment, and introducing or changing over time at least one variable affecting the properties of the at least one polymer that can be modified to produce a combinatorial library of materials. The composition may be exposed to a temperature of about 100° C. to about 180° C. while it is exposed to a high shear environment. The materials of the library may further be evaluated.

The composition when introduced into the apparatus comprises 90 weight % solids or less. The composition may comprise at least one polymer that is temperature sensitive.

The thermally-induced reaction may remove at least one protective group to expose a functional group. The exposed functional group may be capable of undergoing a grafting reaction. For example, the functional group may ethylenically or acetylenically unsaturated. An in situ chemical reaction may be caused to take place at the functional group. A library of graft polymers may be made.

The thermally-induced reaction may comprise the elimination of isobutylene and water from methacrylic and acrylic esters to produce one or both of acid and anhydride functionalities. This reaction may be catalyzed, optionally by an acid.

The thermally-induced reaction may comprise the elimination of trialkylsilanes from trialkylsiloxy end or side group containing polymers to produce a library of hydroxyl end or side group functional polymers. The thermally-induced reaction may comprise the elimination of trialkylsilanes from trialkylsilazane end or side group containing polymers to produce a library of amino end or side group functional polymers.

The thermally-induced reaction may comprise a deesterification reaction to produce a library of hydroxyl- or carboxylic acid-functionalized polymers. This reaction may be base-catalyzed.

The thermally-induced reaction may comprise the elimination of $N_2$ from acyl azides and subsequent rearrangement to form isocyanate functionality.

The thermally-induced reaction may comprise the elimination of benzenesulfenic acid from poly(vinyl phenyl sulfoxide) to produce a library of polyacetylene-containing polymers.

The thermally-induced reaction comprises the elimination of trialkylsilanes from trialkylsilthiane end or side group containing polymers to produce a library of thiol end or side group functional polymers. The thermally-induced reaction may comprise the elimination of trialkylsilanes from trialkylsilyl-substituted ethynyl monomers, such as 2-, 3- and 4-[(trimethylsilyl)-ethynyl]styrenes, to produce a library of ethynyl-containing side-group or end functionalized polymers.

Variable that can be changed when conducting the method include concentration of starting material, type of starting material, pressure in the reactor, temperature profile in the reactor, amount of energy supplied to a reaction zone, type of energy supplied to a reaction zone, type of component mixing, degree of component mixing, residence time, type and amount of grafting agent, and where and when additional components are introduced into the reactor. Other variables include physical mixing of components and chemical reaction of components. The variables may be changed in a continuous manner or a stepwise manner.

The mixing apparatus may comprises a high viscosity devolatilizer, such as a LIST apparatus. The mixing apparatus may be operated in series with one or more other continuous reactors. The ability to control feed flows, feed locations, and compositional variations in a devolatilizing reactor provides an opportunity to produce a variety of compositions in a continuous, economical, and scalable fashion. A major advantage of producing a combinatorial library of materials in a devolatilizing reactor is that different library components need only be separated in time. They do not need to be physically separated.

As Used Herein:

"actinic radiation" means electromagnetic radiation, preferably UV and IR;

"axial mixing" means mixing in a direction parallel to the overall direction of flow in a reactor;

"block copolymer" means a polymer having at least two compositionally discrete segments, e.g., a di-block copolymer, a tri-block copolymer, a random block copolymer, and a star-branched block copolymer;

"combinatorial" means combining two or more components and incrementally changing one or more variable(s) that can affect the component(s) or how the components interact;

"continuous" means generally that reactants enter a reactor at the same time (and, generally, at the same rate) that polymer product is exiting the same reactor;

"devolatilizing kneader" means an apparatus that provides mixing or kneading action and is capable of operation under vacuum sufficient to remove volatile by-products;

"di-block copolymer" or "tri-block copolymer" means a polymer in which all the neighboring monomer units (except at the transition point) are of the same identity, e.g., —AB is a di-block copolymer comprised of an A block and a B block that are compositionally different, ABA is a tri-block copolymer in which the A blocks are compositionally the same, but different from the B block, and ABC is a tri-block copolymer comprised of A, B, and C blocks, each compositionally different;

"end-functionalized" means a polymer chain terminated with a single functional group on one or both chain ends;

"energy" means actinic radiation, thermal energy, and electron beam;

"functional group" means an appended moiety capable of undergoing a reaction;

"high shear environment" means mixing conditions in which physical mixing elements provide shear stress and intense mixing to blend materials having high melt viscosities;

"high viscosity devolatilizer" means an apparatus that provides a high shear mixing environment and a vacuum sufficient to remove volatile by-products from a material or mixture of materials;

"hydrogenated" means fully or partially hydrogenated; i.e., hydrogen has been added to all or some double bonds of an unsaturated molecule;

"in situ grafting" means a grafting reaction is carried out on a material that has been functionalized during the same process run; i.e., the material is not removed from the reactor between the functionalizing and grafting reactions;

"living anionic polymerization" means, in general, a chain polymerization reaction that proceeds via an anionic mechanism without chain termination or chain transfer. (For a more complete discussion of this topic, see Anionic Polymerization Principles and Applications. H. L. Hsieh, R. P. Quirk, Marcel Dekker, NY, N.Y. 1996. Pg 72–127);

"living end" means a stable radical, cation, or anion capable of undergoing further polymerization reactions;

"modify" means perform a reaction to change the chemical nature of a material or a mixture of materials by physical and/or chemical reactions;

"plug" means a theoretical slice of a reaction mixture cut in a direction perpendicular the overall direction of flow in a reactor;

"plug flow reactor (PFR)" means a reactor that ideally operates without axial mixing (see An Introduction to Chemical Engineering Kinetics and Reactor Design; Charles G. Hill J. Wiley and Sons 1977, p. 251);

"polydispersity" means weight average molecular weight divided by number average molecular weight; polydispersity is reported as a polydispersity index (PDI);

"protected functional group" means a functional unit that is reactive after the removal of a "protective" group that prevents reaction at a particular site;

"radial mixing" means mixing in a direction perpendicular to the overall direction of flow in a reactor;

"random block copolymer" means a copolymer having at least two distinct blocks wherein at least one block comprises a random arrangement of at least two types of monomer units;

"reaction zone" means a portion or portions of a reactor or reactor system where at least one specific interaction of components occurs such as physical reaction, e.g., mixing, or a chemical reaction; it may also refer to one or more portion(s) of a reactor that is independently controllable as to conditions such as temperature;

"residence time" means the time necessary for a theoretical plug of reaction mixture to pass completely through a reactor;

"star-branched polymer" means a polymer consisting of several linear chains radiating from junction points (See Anionic Polymerization Principles and Applications. H. L. Hsieh, R. P. Quirk, Marcel Dekker, NY, N.Y. 1996. Pg 333–368);

"star-branched block polymer" or "hyper-branched block copolymer" means a polymer consisting of several linear block chains linked together at one end of each chain by a single branch or junction point, also known as a radial block copolymer (See Anionic Polymerization Principles and Applications. H. L. Hsieh, R. P. Quirk, Marcel Dekker, NY, N.Y. 1996. Pg 333–368);

"temperature profile" means the temperature or temperatures experienced by a reaction mixture plug over time as it moves through a reactor (For example, if the temperature is constant through the reactor, the temperature profile will have a zero slope; if the temperature increases through the reactor, the profile will have a positive slope);

"temperature-sensitive" means a monomer susceptible to significant side reactions such as degradation, cross-linking, and chain scission with reactive sites, such as carbonyl groups, on the same, or different, polymer chain as the reaction temperature rises; and "thermally-induced reaction" means a reaction that is induced or driven by heat.

An advantage of at least one embodiment of the present invention is that a devolatilizing reactor may be operated as a part of a continuous system. Accordingly, libraries formed with this system can have members with masses greater than members made in confined volumes, e.g., to the size of microtitre plates, and can be made at higher process rates.

An advantage of at least one embodiment of the present invention is the ability to scale libraries of compositions from laboratory scale quantities to production-scale quantities.

An advantage of at least one embodiment of the present invention is that multiple reagents can be added along the reactor length with ease.

An advantage of at least one embodiment of the present invention is that the possibility of exposing the reactor system to potential contaminants is reduced (compared to using a batch reactor) due to the ability to continuously feed reactants through stable, enclosed feed systems.

DETAILED DESCRIPTION

The present invention provides continuous methods of making a combinatorial library of materials using a devolatilizing reactor. According to the present invention, at least one of one or more components introduced into the reactor, or at least one process variable affecting the component(s), is changed to produce a combinatorial library of materials.

The methods of the present invention can be used in combination with other batch or continuous combinatorial reactor systems, including temperature-controlled, stirred tubular reactors, shrouded extruders, static mixers, and pouch-based systems such as those described in U.S. patent applications Ser. Nos. 09/793,666 and 09/824,330.

Materials generally pass through the devolatilizing reactor in a plug flow manner. In other words, due to the configuration and/or operation of the reactor, any particular selected plug of material traversing the reactor has minimal axial mixing with an adjacent plug of material even though there will be radial mixing within the plug. This aspect of the reactor allows samples to be continuously and sequentially made with different starting materials or under different processing conditions even though the samples may not be physically separated. Such a system provides many operating advantages such as the ability to make many samples, including those obtained under non-steady state conditions, and no "down time" when materials or operating conditions are changed. This is because operation does not have to be stopped to change the composition of, or conditions of making, the individual samples. Changes can be made while the plug flow reactor is operating. Samples can be continuously collected as they exit the reactor. Additionally, one only needs to know the time that particular starting materials are added (or the time at which another change took place), the residence time of the material passing through reactor (typically the flow rate), and the time a particular sample is collected to be able to collect samples and later determine their starting materials or the operating conditions they were subjected to.

An advantage of the combinatorial approach to materials synthesis of the present invention includes the ability to vary components of a material without stopping the reaction process. The material libraries synthesized may comprise any number of members, depending on how many factors are varied during the operation of the reactor.

A particular sample can be traced from the time it enters the reaction system to the time it leaves the system, based on the flow rate of the materials through the system. The time a sample remains in the system is referred to as its residence time. When the residence time and the time the raw material enters the reactor are known, it can be determined when the sample will exit the system. With this information, the resulting material can be matched up with the starting materials and with changes in process conditions or composition additions made as the material flowed through the reactor. In-line analysis is not required to determine where different plugs of materials are to be collected. Only knowledge of the residence time of a particular interaction is needed to collect distinct plugs after a variable has been changed. However, reactor systems could be interfaced with on-line detection capabilities (UV, IR, Raman, Viscometers) if desired. A combinatorial library of materials generally refers to a group of related samples of materials wherein each sample is different in some way from the other samples. The difference may be, e.g., the type of components, amount of components, or conditions to which the sample is subjected, such as temperature and pressure. The ability to rapidly and easily vary a number of aspects of the reactor system, especially while it is being continuously operated, can substantially increase the scope and number of different samples in a library compared to libraries made by conventional combinatorial methods.

Unlike typical combinatorial synthesis approaches, the process of the present invention provides the capability to change or adjust the process variables as well as the residence time of each sample. The process of the invention also makes it possible for instantaneous addition to, or alteration of, individual samples during the reaction process. For example, additional reactive components may be added at various points along the reaction path.

Changes to the reactor system may be made in a variety of ways. For example, if the effect of an amount of a particular component is being studied, the amount added may be varied. The variation may be done in a linear or stepwise manner. If the type of component being added is being studied, different types of components may be sequentially added at the entrance of the reactor, or at some particular downstream point.

Operating conditions, such as pressure, or energy exposure may also be changed for only a particular sample or set of samples. For example, a section of the reactor, or the entire reactor, may be cooled while some sample(s) pass through, then the temperature may be raised for subsequent sample(s). Alternatively, a condition can be continuously varied and the resulting material continuously analyzed, even if steady state conditions are not reached.

The reactor system of the invention will also easily allow for changing more than one component or operating condition at a time. In addition, the reactor provides the advantage of being able to control the size of a particular sample. Sample sizes can range from, e.g., milligram to multi-kilogram, or whatever amount is desired. This flexibility can allow for appropriately sized samples to be made based on the intended screening method.

Within the reactor, chemical or physical reactions can occur as a sample passes through a reaction zone. A reaction zone may be the entire length of the reactor, or may be limited to a particular section of the reactor. A reaction zone may be used to subject a sample to at least one of, e.g., heat, cold, UV radiation, e-beam irradiation, pressure, or vacuum. The duration for which each sample is subjected to process variables may be controlled by adjusting the length and/or diameter of the reaction zone(s) or the rate at which components pass through the reaction zone. The samples may be collected in separate or adjoining containers and can be labeled and individually archived for subsequent or further reaction or analysis.

Once the sample has been removed from the reaction zone and the chemical and/or physical reaction has taken place, the sample can be analyzed using techniques such as IR, far IR, UV, visible or Raman spectroscopy, refractive index, acoustical measurement, compression testing, viscometry, light scattering, nuclear magnetic resonance (NMR), gel permeation chromatography (GPC), differential scanning calorimetry (DSC), thermogravimetric analysis (TGA), dynamic mechanical analysis (DMA), x-ray diffraction (XD), and mass spectral analysis (MS), impedence measurements, ultrasonics, and the like.

One aspect of the present invention employs thermally-induced reactions to modify polymeric materials. Many types of thermally-induced reactions are suitable for the present invention. One suitable type of reaction is a rearrangement reaction in which the substituents or moieties of a molecule are rearranged to form a new molecule, i.e., the bonding site of a substituent or moiety moves from one atom to another in the same molecule. Another suitable type of reaction is an elimination reaction in which one or more substituents is removed from a molecule. Specific types of reactions that can be carried out include, but are not limited to, pyrolysis reactions, acid-catalyzed reactions, deprotection reactions, condensation reactions, hydrolysis reactions, imidization reactions, base-catalyzed reactions, and deesterification, e.g., deacetylation. In a pyrolysis reaction, a complex molecule is broken into simpler units by the use of heat. In an acid-catalyzed reaction, acid is used to drive or induce the thermal reaction. In a deprotection reaction, a protecting group is removed to expose a reactive functional group. In a condensation reaction, two molecules react to form a new molecule and release a byproduct, which is typically water. In a hydrolysis reaction, water reacts with another molecule (e.g., ester) to form one or more new molecules. In an imidization reaction, anhydrides react with primary amines via an intermediate amic acid functionality to form an imide ring and water. In a base-catalyzed reaction, base is used to drive or induce the thermal reaction. In a deesterification reaction, an ester is converted into a carboxylic acid or an anhydride. In a deacetylation reaction, an ester is converted into an alcohol with removal of an acetyl group. See, for example, Hawker et al., *Macromolecules,* 1998, 31, 1024.

One type of reaction may be followed by a subsequent reaction. For example, the acid catalyzed desterification or modification reaction of poly(meth)acrylic esters to form polymethacrylic acid is followed by a condensation reaction to form polymethacylic anhydride or a functional group exposed by a deprotection reaction may then be further reacted, e.g., by grafting a moiety to the deprotected site.

Once the initial reaction has occurred, further reactions, such as hydrolysis, condensation and in situ grafting may be performed.

Reactor System

The thermally-induced reactions of the present invention are carried out in a mixing apparatus that provides a high shear environment and has devolatilization capabilities. The intensive mixing provided by a high shear environment continually brings different portions of the reacting mixture to the surface of the bulk of mixture material. At the bulk surface, reaction products are exposed to the vacuum in the apparatus. The vacuum causes the lower molecular weight products, which are typically undesirable by-products, to be drawn out of the reacting mixture. Removal of the by-products causes the kinetics to favor additional reactions. Accordingly, as the mixture moves through the mixing apparatus, the desired (higher molecular weight) product is continuously produced, and remains in the mixture, while undesired (low molecular weight) by-products are removed from the mixture. The high shear and devolatilization characteristics of the apparatuses used in the present invention, which provide a favorable reaction equilibrium, allow the thermally-induced reactions to be carried out at temperatures lower than would otherwise be required. The ability to use lower temperatures provides the added advantage of enabling the production of molecules that could not be made previously due to problems with, e.g., thermal degradation and crosslinking.

In the present invention, reactions are typically carried out at temperatures of about 100° C. to about 180° C., but may be carried out over a broader range of temperatures, e.g., 50 to 250, and is only limited by the availability of suitable heat transfer fluids. Many reactions that can be carried out per the present invention normally require higher temperatures, e.g., 200° C. or higher because the apparatus used do not provide efficient mixing and heat transfer. The higher temperatures are needed to ensure that the inner portions of the bulk material are sufficiently heated to drive the reaction. However, these higher temperatures can have detrimental effects, such as polymer degradation, as explained above.

Even though the high shear environment and devolatilization characteristics of the apparatus of the present invention allow reactions to be carried out at temperatures lower than would otherwise be required, most of the processes are carried out at above-ambient temperatures. When the polymer and/or the reaction mixture is processed at above-ambient temperatures, addition of a thermal stabilizer to the reaction mixture is preferred. A variety of thermal stabilizers, including hindered phenols and phosphites, are widely used in the industry. Whichever stabilizer is used, it is preferably soluble in the reaction mixture and products; otherwise, a solvent will be necessary as a delivery mechanism.

The methods of the present invention can be carried out using batch or continuous processes. Methods of the present invention are particularly advantageous for use with continuous systems such as those described in copending U.S. patent application Ser. No. 09/500,155, having the title "Continuous Process for the Production of Controlled Architecture Materials," because the apparatus of the present invention can be set up in series with a polymer-producing apparatus so that the starting polymeric material is fed directly into the mixing apparatus.

The mixing apparatuses of the present invention are capable of handling highly viscous polymer melts. For example, they can process polymer melts having viscosities as high as about 500,000 cps (500 Pascal (Pa) seconds) and solids concentrations of about 1 to about 90 weight %. They can process these high viscosity materials at residence times of about 10 to about 60 minutes. The mixing apparatuses also have devolatilization capabilities. The apparatuses may come standard with vacuum equipment or may be fitted with vacuum equipment. The apparatuses can maintain a vacuum of about 1 to about 200 torr (about 133 to about 26600 Pa) under high viscosity mixing conditions.

The mixing apparatus are also, preferably, temperature-controlled. The apparatuses may have one or more temperature-controlled zones. If the apparatus has more than one temperature-controlled zone, a temperature gradient can be maintained through the mixing apparatus. This can be advantageous in many situations, for example when carrying out an exothermic reaction, because the need for heat removal can vary throughout the reactor, depending on the reaction being carried out.

Apparatuses that are suitable for the present invention include high viscosity processors and vacuum-fitted high performance kneaders. These apparatuses provide a high shear environment, devolatilization capabilities, and, optionally, temperature-controlled zones.

A suitable high viscosity processor, which comes standard with vacuum equipment, is a LIST Discotherm B processor (available from List AG, Acton, Mass.). The LIST Discotherm B high viscosity processor (described in more detail in the Examples section) is ideally suited for use in the present invention. It provides intensive mixing and kneading in combination with large heat-transfer surfaces and long residence times thereby enabling the reaction and the removal of by-products to take place with great ease. The heat transfer surfaces are continuously swept by kneading elements, which increases thermal efficiency and ensures high heat transfer rates. The LIST's inner cavity also provides a large working volume (i.e., volume occupied by the reaction mixture) and fill level, thus allowing for high throughput and long retention times. Also, the working volume occupies only about 60% of the total volume of the reactor, which provides ample room to allow for disengagement and flashing of off-gases and vapors as they are brought to the bulk surface by the intensive mixing.

Suitable kneaders, fitted with a vacuum system, include an MKD 0,6-H 60 IKA kneader (described in more detail in the Examples section), Buss kneaders (available from Coperion Buss AG, Pratteln, Switzerland), and Srugo Sigma kneaders (available from Srugo Machines Engineering, Netivot, Israel). The kneaders are fitted with vacuum equipment by attaching a vacuum pump to vacuum ports on the kneader.

Process Variables

The production of desired modified polymers can be obtained by controlling various process variables. Process variables can influence, for example, the speed at which, and extent to which, a reaction takes place, and ratio of functional groups produced. Variables that can be changed when conducting the method include: concentration or composition of starting material, type of starting material, pressure (i.e., vacuum) in the mixing apparatus, temperature and/or temperature profile in the reactor, type and amount of component or grafting agent added, degree of mixing, residence time, and where and when additional components are introduced into the high viscosity reactor. For example, the level of deprotection can be increased by increasing the temperatures and/or increasing the vacuum levels to affectively remove byproducts. If less deprotection, modification or elimination is desired the vacuum level can be lessened or the temperature can be lowered.

The variables may be changed in a continuous manner or a stepwise manner. The ability to control feed flows, feed locations, and compositional variations in a high viscosity reactor provides an opportunity to produce a variety of compositions in a continuous, economical, and scalable fashion.

Starting Polymer Systems

Suitable starting polymeric materials include controlled architecture materials (CAM), which are polymers of varying topology (linear, branched, star, star-branched, combination network), composition (di-, tri-, and multi-block copolymer, random block copolymer, random copolymers, homopolymer, graft copolymer, tapered or gradient copolymer, star-branched homo-, random, and block copolymers), and/or functionality (end, site specific, telechelic, multifunctional, macromonomers).

The invention allows the modification polymers synthesized by step growth polymerizations, specifically tradition or living/controlled free radical, group transfer, cationic or living anionic polymerizations. Suitable starting polymers include the fluorinated materials described in co-pending patent application U.S. Ser. No. 10/211,096, incorporated by reference. Of most industrially relevant are tradition or living/controlled free radical and living anionic polymerizations.

The starting polymeric materials may be made by any method known in the art. For example, the may be made by the method described in copending U.S. patent application Ser. No. 09/500,155.

The starting polymer systems may be synthesized in processes that are carried out in batch, semibatch, continuous stirred tank reactor (CSTR), tubular reactors, stirred tubular reactors, plug flow reactors (PFR), temperature controlled stirred tubular reactors as described in WO 0158962 A1 and co-pending U.S. patent application. Ser. No. 09/824,330, static mixers, continuous loop reactor, extruders, shrouded extruders as described in WO 9740929, and pouched reactors as described in WO 9607522 and WO 9607674. The media in which the polymerizations may take place are bulk, solution, suspension, emulsion, ionic liquids or supercritical fluids, such as supercritical carbon dioxide.

Specific methods of making the starting polymer systems include atom transfer radical polymerization (ATRP), reversible addition-fragmentation chain transfer polymerization (RAFT), and nitroxyl or nitroxide (Stable Free Radical (SFR) or persistant radical)-mediated polymerizations. These controlled processes all operate by use of a dynamic equilibrium between growing radical species and various dormant species (see Controlled/Living Radical Polymerization, Ed. K. Matyjaszewski, ACS Symposium Series 768, 2000).

Suitable starting materials include those with a terminal unsaturated carbon-carbon bond, such as anionically-polymerizable monomers (see Hsieh et al., *Anionic Polymerization: Principles and Practical Applications*, Ch. 5, and 23 (Marcel Dekker, New York, 1996) and free radically-polymerizable monomers (Odian, *Principles of Polymerization*, $3^{rd}$ Ed., Ch. 3 (Wiley-Interscience, New York, 1991)).

At least one aspect of this invention provides utility in particular for temperature-sensitive monomers. Examples of temperature sensitive monomers include styrenes, dienes, (meth)acrylates, and mixtures thereof, as well as polymeric systems that degrade at elevated temperatures over long periods of time.

Other suitable monomers include those that have multiple reaction sites. For example some monomers may have at least two anionically-polymerizable sites. This type of monomer will produce branched polymers. This type of monomer preferably comprises less than 10 molar percent of a given reaction mixture because larger amounts tend to lead to a high degree of crosslinking in addition to branching. Another suitable monomer is one that has at least one functionality that is not anionically-polymerizable in addition to at least one anionically polymerizable site.

Polyolefin-based CAM's are also suitable materials for the modification reactions of the present invention. These polyolefin CAM's may be made by hydrogenation of polydiene systems. Particularly useful are hydrogenated poly (butadiene), polyisoprene poly(1,3-pentadiene), and poly(1, 3-cyclohexadiene), which can be synthesized via "living" anionic polymerization. Hydrogenation of such polydienes produces various polyolefins, the nature of which is controlled by the polymer backbone microstructure. For example hydrogenation of poly(1,4-butadiene) produces a polyethylene-like structure, while hydrogenation of poly(1,2-butadiene) produces a polyethylethylene (ie. polybutylene) structure.

This ability to hydrogenate and subsequently modify polyolefin-based CAM's can be used to produce dispersants, compatibilizers, tie layers, and surface modifiers that are unique, polyolefin-miscible, and industrially-useful.

Hydrogenation of polymer blocks can be performed by various routes including homogeneous diimide reduction as described by Hahn in *J. Polym. Sci: Polym Chem.* 1992, 30, 397, and by heterogeneous Pd catalyzed reduction as described by Graessley *J. Polym. Sci; Polym Phys. Ed.* 1979, 17, 1211. The diimide reduction involves the use of organic reducing agents such as p-toluenesulfonhydrazide in the presence of a trialkyl amine (e.g., tripropyl amine) and xylene as a solvent at temperatures of 140° C.

Fluorinated materials, such as fluorinated (meth)acrylates, are also suitable for use in the present invention. Fluorinated monomer units may comprise co-monomers in the materials of the present invention. The fluorinated materials may comprise, for example, a backbone mer unit having the following Formula I

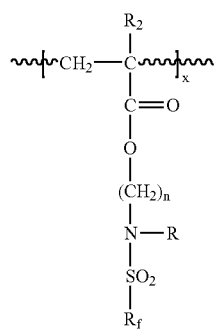

where ⁓⁓⁓ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1. The fluorinated materials may be end-functionalized at one or both terminus with reactive end groups. If there are two reactive end groups, they may be the same or different. Fluorinated diene, methacrylate and styrenic homo and block copolymers end-functionalized with alcohol(s), thiol(s), and/or amine(s) may be synthesized anionically by the use of suitable anionic initiators which contain protected functional groups that can be removed by post polymerization techniques. Suitable functional initiators are known in the art and are described in, e.g., U.S. Pat. Nos. 6,197,891, 6,160,054, 6,221,991, and 6,184,338.

The fluorinated materials may be made by the same living anionic polymerization methods previously described. A more detailed description of some suitable fluorinated materials is in co-pending patent application U.S. Ser. No. 10/211,096.

Thermally-Induced Reactions

As previously stated, a variety of thermally-induced reactions may be carried out on starting materials using the processes of the present invention. This section provides non-limiting examples of reactions that can be carried out.

One suitable reaction is the rearrangement of an acyl azide to provide an isocyanate group (i.e., a Curtius rearrangement) as shown in Formula I

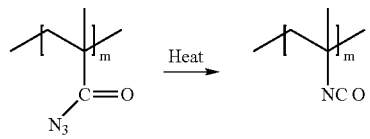

In this reaction $N_2$ is eliminated and a nitrogen atom replaces the carbon atom that is attached to the polymer backbone to form an isocyanate functionality.

Various reactions may be carried out to produce acetylene-containing polymers. In these reactions, a sulfoxide is pyrolyzed to give the polyactylene and a sulfenic acid byproduct (RSOH) as shown in Formula II. For example, a benzenesulfenic acid may be eliminated from poly(phenyl vinyl sulfoxide)-containing copolymers to produce polyacetylene-containing copolymers, such as poly(styrene-acetylene) block copolymers. Polyacetylene is typically difficult to work with because it is very insoluble in other materials. However, including it in a block structure allows the final structure to remain soluble.

Vinyl sulfoxides having the general structure $CH_2$=CH—SOR are suitable for polymerization. Applicable R groups include primary alkyl, aryl, and alkylarylamines, for example, an alkyl group having 1 to 10 carbon atoms, a cycloalkyl group having 5 to 12 carbon atoms, an aralkyl group having 7 to 22 carbon atoms or an aryl group having 6 to 12 carbon atoms.

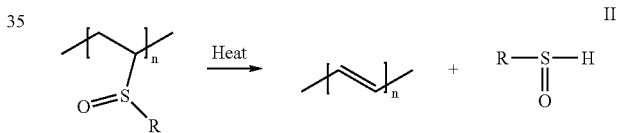

In other suitable reactions, polymeric materials containing methacrylic and acrylic esters can be modified, e.g., functionalized or deesterified, by treatment with catalytic amounts of acid at above-ambient temperatures. The treatment with acid at above-ambient temperature causes ester alkyl-oxygen cleavage, resulting in the release of relatively volatile aliphatic reaction products to form (meth)acrylic acid functionalized polymers, followed by (in some cases) the release of water via a condensation reaction to form (meth)acrylic anhydride functionalized polymers as shown in Formula III. This method can be applied to a vast array of polymeric reagents to produce acid and anhydride functionality.

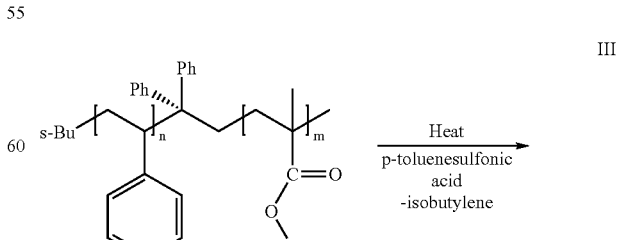

R = t-Bu

-continued

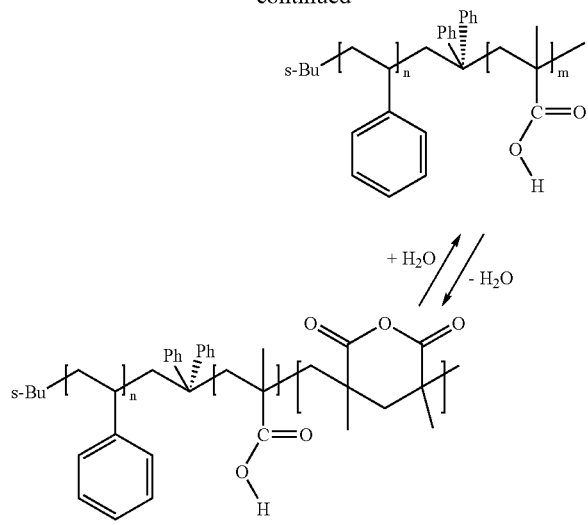

Appropriate (meth)acrylic ester-containing polymers include homopolymers, block copolymers, random copolymers, graft copolymers, starbranched and hyperbranched polymers. Specific examples include, but are not limited to, polymers containing t-butyl methacrylate, t-butyl crotonate, t-butyl acrylate, t-pentyl acrylate, 1,1-dimethylethyl-α-propylacrylate, 1-methyl-1-ethylpropyl-α-butylacrylate, 1,1-dimethylbutyl-α-phenylacrylate, t-hexyl acrylate, t-octyl methacrylate, isopropyl methacrylate, cyclohexyl methacrylate, and t-pentyl methacrylate. The preferred systems include t-butyl acrylate and t-butyl methacrylate.

The reaction may also be carried out on block copolymers containing methacrylic or acrylic block segments. Block copolymers containing poly(methacrylic acid) (PMAA), poly(acrylic acid) (PAA), poly(methacrylic anhydride) and poly(acrylic anhydride) block segments are typically difficult to introduce into a polymeric material, particularly in block copolymer systems synthesized by anionic routes, due to the inability of methacrylic/acrylic acid or methacrylic/acrylic anhydride to participate in anionic polymerizations. The present invention makes it easier to introduce these groups because they are in a protected form, which is amenable to conventional living polymerization techniques. These protecting groups are readily removed using the procedures described in this invention, resulting in a useful strategy to introduce these reactive functional groups into a polymeric backbone.

Polymeric materials containing t-butyl methacrylate groups are attractive reagents for this acid-catalyzed pyrolysis reaction because the t-butyl groups can be easily removed to produce methacrylic acid (PMAA) and methacrylic anhydride (PMAn) moieties, which may impart water solubility or provide reactive functionality to polymer systems.

Suitable acids for the above modification or deesterification include the aromatic sulfonic acids, methanesulfonic, ethanesulfonic, 2-propanesulfonic, benzenesulfonic, trifluoromethanesulfonic, and preferably, toluenesulfonic acid.

In addition to the catalytic acid modification, the methacrylate ester functionality may also be modified by the use of an alkali metal superperoxide such as potassium superperoxide in a suitable solvent such as a mixture of dimethyl sulfoxide and tetrahydrofuran. This technique has been taught for example by R. D. Allen, et al., *Coulombic Interactions in Macromolecular Systems, A.C.S. Symposium Series,* #302, pg. 79–92 (1986). The resulting modified product may be acidified with small amounts of an acid such as hydrogen chloride to improve solubility. Due to the difficulty in handling such reagents, the latter method is not preferred for commercial use.

In processes other than those of the present invention, typically, t-butyl methacrylate segments undergo thermally induced deesterification, under solventless conditions at temperatures above 200° C., or in solution, in the presence of trace acid for extended periods (8–12 hr) at 110° C. These known processes have several drawbacks such as: (1) in the bulk state, anhydride formation is hampered by the inefficient removal of by-products such as water, which can be trapped due to hydrogen bonding with the newly formed methacrylic acid segments; and (2) solution deesterification of (meth)acrylate materials often requires long reaction times, rendering any industrial solution process costly.

At least one aspect of the present invention overcomes these drawbacks because it allows for a lower temperature solvent-free reaction and it provides superior mixing and vacuum control, which help to drive the above equilibrium reaction to form materials with high anhydride levels.

In another aspect of this invention, polymeric materials containing styrenic-ester monomers can be modified by treatment with a base at above-ambient temperatures. Strong bases are known in the art. See, for example, Hawker et al., *Macromolecules,* 1998, 31, 1024. Examples include potassium t-butoxide and sodium t-butoxide and other alkyl metal oxide bases, amines, metal alkyls known in the art. In reactions of this sort, a molar equivalent of base is added to the reactor. Adding as little as ½ to 1 weight % of base will induce the desired reaction. The treatment with base at above-ambient temperature results in cleavage and the release of relatively volatile aliphatic reaction products and the formation of the desired hydroxyl functionalized polymers. For example the deesterification of esters produces hydroxyl functionalized species, e.g., the deesterification of poly(4-acetoxystyrene) yields poly(4-hydroxystyrene). Deesterification of esters can also lead to carboxylic functionalities, e.g., a poly(alkylbenzoate ester) can yield a poly(alkylbenzoic acid). Formula IV shows a base-catalyzed deesterification.

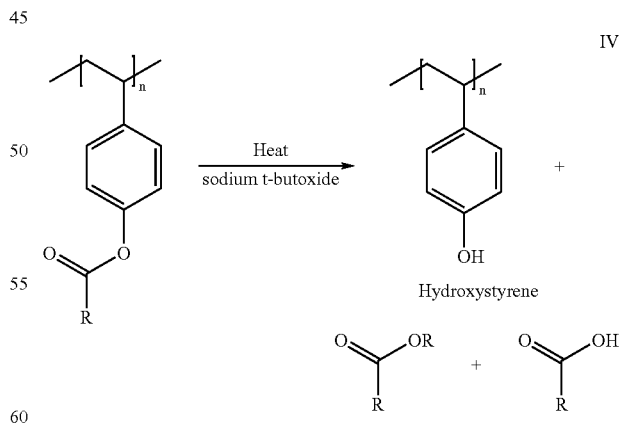

For Formula IV, appropriate starting polymers include those that contain, for example, para-, meta-, or ortho-acetoxystyrene. R may be any alkyl ester or aryl ester, preferably a primary alkyl ester.

Aspects of the present invention are also suitable to carry out deprotection reactions. Polymeric systems containing latent or protected functional groups can be synthesized, for example, in an extruder or stirred tube reactor, or by other known methods. The protecting groups are added to prevent the functional groups from reacting until the desired stage of a reaction process. The functional groups can be side groups or end groups. They can be, e.g., ethylenically or acetylenically unsaturated. After being incorporated into a polymer, these protected functional groups can undergo deprotection, to expose or produce functionalities at desired locations in the polymeric material. The functional groups will be in various locations in the backbone if included in a random polymer; will be in segments of the backbone if included in a block copolymer; and will be at the terminus of a polymer chain if included as a capping agent. An in situ formation of a block copolymer consisting of reaction of functionalized polymers and another polymer bearing acceptable terminal groups is also possible during reactive blending. Reaction of amines with anhydrides exhibit sufficiently fast kinetics in the melt state to provide technologically useful, compatibilized polymer blends.

Diene, methacrylate and styrenic homo and block copolymers end-functionalized with alcohol(s), thiol(s), and/or amine(s) may be synthesized anionically by the use of suitable anionic initiators which contain protected functional groups that can be removed by post polymerization techniques. Suitable functional initiators are known in the art and are described in, e.g., U.S. Pat. Nos. 6,197,891, 6,160,054, 6,221,991, and 6,184,338.

End-functionalized materials can also be synthesized by adding reagents that contain reactive halogen or unsaturated groups capable of quenching a "living" anionic polymerization as described above. Anionic polymerizations are not readily amenable to the polymerization of monomers containing relatively acidic, proton-donating groups such as amino, hydroxyl, thiol, carboxyl or acetylene functional groups. However, these groups can be included in the polymer via incorporation in functional quenching agents, i.e., a reactive moiety containing a protected functional group capable of quenching or terminating an anionically produced polymer chain, if protected by suitable protecting groups that are stable at the conditions of anionic polymerization and can be readily removed by post polymerization treatments. Suitable functional quenching agents include 1,3-bis(trimethylsilyl)carbodiimmide, and 1-(3-bromopropyl)-2,2,5,5-tetramethyl-1-aza-2,5-disilacyclopentan Block copolymers containing hydroxyl, amino, or thiol functionalities are difficult to introduce into a polymeric material, particularly in systems synthesized by anionic routes, due to the inability of compounds such as hydroxyethyl methacrylate, 4-vinylphenylethyl amines, or 4-vinylphenyl thiol to participate in anionic polymerizations. A popular route to these block copolymers involves the polymerization of (meth)acrylic-or styrenic-based monomers having protected functional groups. After polymerization, a deprotection reaction is carried out to produce hydroxyl, amine, and thiol functionalities. This method is an attractive approach to imparting water solubility or providing reactive functionality to polymer systems.

Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

A number of trialkylsilane deprotection reactions are also suitable for the present invention. These reactions include acid and fluoride anion deprotection reactions that remove the protecting trialkylsilane groups from terminal- or side-chain-functionalized polymers, such as trialkylsilthiane end- or side-group containing polymers. For example, trialkylsilanes can then be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection. Hydroxyl end- or side-group functionalized polymers, such as that shown in Formula V, can be readily accessed by anionic polymerization of styrene derivatives such as 4-(t-butyldimethylsilyloxy) styrene, 5- or 4-vinyl-1,3-benzodioxoles and 4-vinylphenyl ethanol protected with t-butyldimethylsilyl or trimethylsilyl groups. Methacrylic hydroxyl-containing species can be accessed by polymerization of 2-hydroxyethyl methacrylate protected with a trimethylsilyl group or 2,3-dihydroxypropyl methacrylate masked with a dioxolane ring. The trimethylsilyl group or dioxolane ring can then be removed.

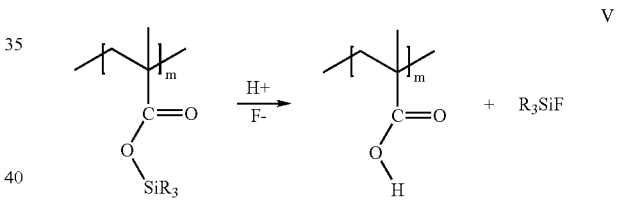

V

Thiol end- or side-group functionalized polymers can be obtained by the polymerization of 4-vinylphenyl thiol and 4-vinylphenylethyl thiol protected with a t-butyldimethylsilyl group. The t-butyldimethylsilyl group can then be removed.

Amino end- or side-group functionalized polymers can be obtained by the polymerization of styrenic monomers derived from 4-vinylphenyl, 4-vinylphenylmethyl, and 4-vinylphenylethyl amines protected with two trimethylsilyl groups. The trimethylsilyl groups can then be removed.

Formyl (aldehyde) end- or side-group functionalized polymers can be obtained by polymerizing styrenic systems derived from dioxolane-functionalized benzaldehyde, and N-[(4-vinylphenyl)methylene]-cyclohexamine. 3,4-Acyl substituted styrenes can be incorporated by silyl enol ether routes such as the t-butyldimethylsilyl protected enol ethers of vinylacetophenones. The t-butyldimethylsilyl groups can then be removed.

Carboxy end- or side-group functionalized polymers can be obtained by polymerizing 4-vinyl benzoic acid, protected with oxazoline, ester, or amido functionalities such as in N-(4-vinylbenzoyl)-N'methylpiperazine and t-butyl 4-vinylbenzoate. Methacrylate based trimethylsilyl methacrylate can also be employed. The oxazoline, ester, or amido functionalities can then be removed by treatment with acid.

Ethynyl (acetylene) side-group or end-functionalized polymers can be obtained. For example, ethynyl can be introduced as part of a polymer's side chain structure through anionic polymerization of 2-, 3- and 4-[(trimethylsilyl)-ethynyl]styrenes. The trimethylsilane group(s) can then be removed.

Grafting

After materials have been deprotected such that a functional group is exposed, subsequent reactions can be carried out immediately in the apparatus of the invention. These subsequent reactions can include grafting substituents onto the polymer backbone. Various grafting reactions may be carried out. Typically, these reactions could happen at room temp but occur faster at higher temperatures.

The polymeric materials produced by acid-catalyzed pyrolysis of methacrylic and acrylic esters are methacrylic/acrylic acid or methacrylic/acrylic anhydride functionalized polymers. These acid- and anhydride-functionalized polymers may participate in further grafting reactions including esterification, amidation, and imidization reactions.

In the case of esterification, the acid- or anhydride-functionalized polymeric material is subjected to reaction with small molecule nucleophiles, most preferably alcohols. Suitable alcohols that participate in this reaction consist of, but are not limited to $C_1$ to $C_{20}$, that can contain one or a combination of alkyl, alkenyl, or alkynyl moieties, and which can be straight, branched, or cyclic, or a combination thereof. A lower aliphatic group is typically from $C_1$ to $C_5$. The term alkyl, as used herein, unless otherwise specified, refers to a saturated straight, branched, or cyclic, primary, secondary, or tertiary hydrocarbon, preferably of $C_1$ to $C_{20}$. Mixtures of the foregoing aliphatic alcohols may also be employed. The preferred aryloxy groups (substituted or unsubstituted) may be derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

In the case of amidation or imidization, the acid- or anhydride-functionalized polymeric material is subjected to reaction with amine nucleophiles. Suitable amines that participate in this reaction consist of, but are not limited to, typically primary alkyl, aryl, and alkylaryl-amines. The primary amines formula is $RNH_2$ wherein R stands for an alkyl group having 1 to 10 carbon atoms, a cycloalkyl group having 5 to 12 carbon atoms, an aralkyl group having 7 to 22 carbon atoms or an aryl group having 6 to 12 carbon atoms.

In addition to small molecule nucleophiles, polymeric nucleophiles can be used to add functionality to polymer systems via grafting reactions. For example, hydroxyl-terminated poly(lactide), poly(caprolactone), poly(dimethylsiloxane), and polyethylene glycol can be synthesized by employing a protected alcohol as part of the catalyst system, as known in the art. Amine terminated poly(lactide), poly(caprolactone), poly(dimethylsiloxane), polyethylene glycol, can be synthesized by employing a protected alcohol as part of the catalyst system, as known in the art. Amine and alcohol terminated polymers can be purchased from Aldrich (Milwaukee, Wis.), Tomah (Tomah, Wis.), Shearwater Polymers (Huntsville, Ala.), and Gelest (Morrisville, Pa.).

Diene, methacrylate and styrenic homo and block copolymers end-functionalized with alcohol(s), thiol(s), and/or amine(s) may be synthesized anionically by the use of suitable anionic initiators, which contain protected functional groups that can be removed by post polymerization techniques. Suitable anionic initiators are known in the art and are described in, e.g., U.S. Pat. Nos. 6,197,891, 6,160,054, 6,221,991, and 6,184,338. Objects and advantages of this invention are further illustrated by the following examples. The particular materials and amounts thereof, as well as other conditions and details, recited in these examples should not be used to unduly limit this invention.

EXAMPLES

Time 0 in the Tables indicates the time at which the first sample was taken.

Test Methods

Infared Spectroscopy

Samples were run by two methods: either by slicing small slivers of the sample with a scalpel and examining them on an IRμTS Spectra-Tech Fourier Transform Infrared Microscope (available from Thermo Spectra-Tech, Shelton, Conn.) used in transmission mode or as small slivers melt smeared onto CsBr or KBr crystals and run by transmission on a Bomem MB-100 Fourier Transform Infrared Spectrometer (available from ABB Bomen, Quebec City, Canada).

NMR Spectroscopy

The concentration of each block and confirmation of elimination or rearrangement was determined by Nuclear Magnetic Resonance (NMR) spectroscopy analysis. A sample was dissolved in deuterated chloroform to a concentration of about 10 wt % and placed in a Unity 500 MHz NMR Spectrometer available from Varian, Palo Alto, Calif. Block concentrations were calculated from relative areas of characteristic block component spectra. All spectra were with $H^1$ NMR unless otherwise indicated.

Diffusion Ordered Spectroscopy

Diffusion experiments are currently run on a Varian INOVA 500 MHz NMR spectrometer using a NALORAC 5 mm dual broadband gradient probe. The samples were submitted for diffusion analysis via DOSY (diffusion ordered spectroscopy) to determine if copolymerization and/or hydrolysis of t-butyl groups has occurred. A DOSY Bipolar Pulse Pair Stimulated Echo pulse sequence was used in this experiment, to permit separation of NMR signals in a mixture based on the diffusion coefficients. The gradient was applied to the sample for 50 msec before acquisition of the spectrum.

| Materials Used | |
|---|---|
| Materials | Description |
| Toluene | Available from Worum Chemical, St. Paul, Minnesota. |
| IRGANOX 1076 | Octadecyl 3,5-di-tert-butyl-4 hydroxyhydrocinnamate available from Ciba Specialty Chemicals Corp. Tarrytown, New York. |
| p-Toluenesulfonic acid monohydrate | Available from Aldrich Chemical Co., Milwaukee, Wisconsin. |
| THF | Tetrahydrofuran, available from ISP Technologies, Wayne, New York. |

-continued

Materials Used

| Materials | Description |
|---|---|
| Butylamine | Available from Aldrich Chemical Co. |
| Ethanolamine | Available from Aldrich Chemical Co. |
| Cyclohexylamine | Available from Aldrich Chemical Co. |
| Cyclohexane | Available from Worum Chemical. |
| Isoprene | Available from Aldrich Chemical Co. |
| Styrene | Available from Ashland Chemical, Columbus, Ohio. |
| t-Butyl methacrylate | Available from Sans Esters Corp., New York, New York. |
| Diphenylethylene | Available from Acros/Fisher Scientific, Itasca, Illinois. |
| sec-Butyl lithium | An anionic initiator, 1.3 Molar in cyclohexane, available from Aldrich Chemical Co. |

Continuous Vacuum Reactor

Continuous synthesis reactions were performed in a high viscosity devolatilizer reactor (LIST Discotherm B6 High Viscosity Processor, available from List AG, Acton, Mass.). The reactor consisted of a horizontal, cylindrical housing, comprising 3 zones. Located in the center of the housing was a concentric main screw agitator shaft. Mounted on the shaft (and extending perpendicular to the shaft) were disk elements that had angled peripheral mixing-kneading bars (extending generally parallel to the shaft), Stationary hook-shaped bars mounted on the inside of the housing interacted with and cleaned the shaft and disk elements as they rotated. The arrangement of the disk elements and mixing-kneading bars in concert with the stationary hook-shaped bars imparted a substantially forward plug-flow movement to the material with minimal axial intermixing. Material was discharged from the LIST by a twin-screw discharge screw.

The total volume in the reactor was 17.5 L, with a working volume of 12L. The housing, shaft, and disk elements were all heated via a hot oil heating system. The heat transfer area in the reactor was 0.67 m$^2$. Temperature was controlled and monitored in three locations within the reactor: (1) the reactor entrance zone (temperature T1), (2) the reactor intermediate zone (temperature T2) and (3) the reactor exit zone (temperature T3). A variable speed motor drove the agitator shaft at speeds of 5 to 70 rpm and a maximum torque of 885 ft lbs (1200 Nm). A vacuum pump was attached to the reactor for vapor removal. The condensate was collected in two evacuated, high vacuum glass solvent traps, which were submersed in a slurry bath consisting of a suitable coolant, typically Isopar™ ((isoparaffin hydrocarbons C$_{18-25}$) available from Exxon Company USA, Houston, Tex.) and dry ice ($CO_2$).

Example 1

Continuous Synthesis of Poly(styrene-methacrylic acid/anhydride) Via the p-toluenesulfonic Acid Catalyzed Hydrolysis of Poly(styrene-t-butyl methacrylate) (PS-t-BMA)

This example illustrates, among other things, (1) continuously producing a library of materials (2) combining this invention with other continuous reactor technology, e.g., a temperature-controlled, stirred tubular reactor, and (3) achieving the lower temperatures required for the deesterification reaction in the LIST.

The starting material was a solution of PS-t-BMA in toluene, made in a stirred tubular reactor (STR) according to WO0158962, "Continuous Process for the Production of Controlled Architecture Materials", Example 6, at a solids concentration of about 37 wt %. The block copolymer composition was varied in both number average molecular weight and polydispersity index as a function of time as shown in Table 1. A solution of p-toluenesulfonic acid monohydrate in toluene was prepared by mixing 463 g of p-toluenesulfonic acid monohydrate in 4169 g toluene. The p-toluenesulfonic acid monohydrate solution was pumped via peristaltic pump at a rate of 9.6 g/min into the last zone of the STR and mixed with the PS-t-BMA solution in a ratio of 0.0083 to 1.

TABLE I

| Example | Time (min) | Styrene mole % | t-BMA mole % | M$_n$ × 10$^4$ | PDI |
|---|---|---|---|---|---|
| 1A | 0 | 92.8 | 7.2 | 2.59 | 2.43 |
| 1B | 13 | 80.3 | 19.7 | 3.26 | 2.48 |
| 1C | 30 | 76.7 | 23.3 | 3.12 | 2.68 |

The resultant solution was pumped (via a zenith pump at 19.7 rpm) from the STR to the first zone of the continuous vacuum reactor. The main screw of the vacuum reactor was kept constant at approximately 34 rpm, while the discharge screw of the vacuum reactor was maintained at 47 rpm. The vacuum reactor was maintained at a vacuum of about 2.7 kPa (20 torr) and at temperatures of T1 at about 123° C., T2 at about 174° C. and T3 at about 174° C.

The resulting material was tested with Infrared Spectroscopy and NMR Spectroscopy. Results of the Infrared Spectroscopy confirmed the presence of anhydride groups (1760 cm$^{-1}$) in all of the samples. Quantitative results illustrated in Table 2 showed a comparison of the area under an Infrared Spectroscopy spectra band at 1760 cm$^{-1}$ (from the anhydride) to the area under a spectra band at 1601 cm$^{-1}$ (an aromatic ring absorption), which was assumed to be constant.

TABLE 2

| Example | Time (min) | PS mole % | Pt-BMA mole % | M$_n$ × 10$^4$ | PDI | Area 1601 cm$^{-1}$ | Area 1760 cm$^{-1}$ | Ratio of Areas 1760/1601 cm$^{-1}$ |
|---|---|---|---|---|---|---|---|---|
| 1D | 0 | 95.9 | 4.1 | 2.29 | 2.21 | 0.65 | 0.65 | 1 |
| 1E | 30 | 97.8 | 2.2 | 2.28 | 2.18 | 0.54 | 0.59 | 1.09 |
| 1F | 65 | 98.7 | 1.3 | 2.37 | 2.13 | 1.02 | 1.24 | 1.22 |
| 1G | 105 | 99.2 | 0.8 | 2.51 | 2.13 | 1.48 | 1.6 | 1.08 |
| 1H | 150 | 99.1 | 0.9 | 2.45 | 2.21 | 0.65 | 0.79 | 1.22 |

Results of NMR Spectroscopy revealed the significant decrease in number of t-butyl groups, consistent with deesterification.

Example 2

Continuous Synthesis of Poly(isoprene-methacrylic acid/anhydride) Via the p-toluenesulfonic Acid Catalyzed Hydrolysis of Poly(isoprene-t-butyl methacrylate) (PI-t-BMA)

This example illustrates (1) synthesis using temperature sensitive materials, such as polyisoprene-based copolymers that are susceptible to crosslinking at elevated temperatures and (2) producing libraries of materials with differing acid to anhydride ratio through variation of temperature.

Example 2 was made in a manner similar to Example 1 except different materials were used and some conditions were changed. A reactant, p-toluenesulfonic acid monohydrate (76 g), was added to a solution of (PI-t-BMA) in toluene (19 kg at solids of 40 wt %) in a wt ratio of reactant to solution of 1:100. The mixture was agitated with an air-powered stirrer operated at 100 rpm at room temperature for 20 minutes. The resultant solution was pumped (via a zenith pump at 19.7 rpm) to the first zone of the continuous vacuum reactor. The temperature settings in the vacuum reactor were varied to explore the effect of temperature on extent of deesterification and crosslinking. Table 3 shows the temperature settings and vacuum readings.

Samples were tested continuously with Infrared Spectroscopy. The continuous process was stopped once crosslinking was observed. The continuous run was started again after temperatures decreased to a range where crosslinking would not be evident.

Results of Infrared Spectroscopy revealed the presence of characteristic bands at 1801 and 1758 cm$^{-1}$ associated with an anhydride, at 1709 cm$^{-1}$ associated with an acid functionality and at 1736 cm$^{-1}$ associated with an ester carbonyl as in a methacrylate moiety. The ratio of the anhydride to the acid and the ratio of the ester to acid was calculated from areas under various bands of the infrared spectra. The ratios, which are given in Table 3, show that, under different temperatures, different ratios are obtained for the same polymer.

copolymer to be functionalized, (2) hydrolyzing high mol % P(t-BMA) content block copolymers, (3) affecting the extent and nature of the reaction products of deesterification by controlling pressure and temperature and (4) varying the nature of reagents during performance of in-situ grafting of acid and anhydride containing materials with suitable nucleophiles. The continuous vacuum reactor was modified by adding an entry port in Zone 3 of the LIST.

Six different samples of PS-t-BMA in toluene were made in a stirred tubular reactor (STR) according to WO0158962, Example 6, except the mole ratio of PS and t-BMA was varied, and the polymers were dried. Each polymer was resolvated in toluene (19 Kg at solids of 40 wt %) in a separate container. A reactant, p-toluenesulfonic acid monohydrate (76 g), was added to each polymer solution in a wt ratio of 1:100. The mixture was agitated with an air-powered stirrer operating at 100 rpm at room temperature. The resultant solutions were sequentially pumped (via a zenith pump at ca. 19.7 rpm) to the first zone of the continuous vacuum reactor. The mole ratio of methacrylate (in the t-BMA) to PS and the time of entry for each of the starting materials are shown in Table 4.

TABLE 4

| Example | When Fed (min) | PS mole % | Methacrylate mole % |
|---|---|---|---|
| 3A | 0–120 | 95.3 | 4.7 |
| 3B | 120–155 | 96.8 | 3.2 |
| 3C | 155–201 | 78.0 | 22.0 |
| 3D | 201–247 | 87.0 | 13.0 |
| 3E | 247–296 | 80.1 | 19.9 |
| 3F | 296–end | 66.6 | 33.4 |

The speed of the main screw of the vacuum reactor was maintained at approximately 34 rpm and the speed of the discharge screw was maintained at approximately 136 rpm. Temperature and vacuum settings were varied over time as shown in Table 5. At different time intervals, various nucleophiles (cyclohexylamine, butyl amine, ethanolamine) were fed into the start of zone 3 via a reciprocating piston pump

TABLE 3

| Example | Time (min) | T1 ° C. | T2 ° C. | T3 ° C. | Vacuum kPa (Torr) | Ratio of Anhydride:Acid | Ratio of Ester:Acid |
|---|---|---|---|---|---|---|---|
| 2A | 0 | 91 | 100 | 103 | 19.2 (144) | 0.08 | 0.73 |
| 2B | 10 | 91 | 100 | 110 | 19.2 (144) | 0.10 | 0.72 |
| 2C | 25 | 99 | 110 | 116 | 18.0 (135) | 0.16 | 0.75 |
| 2D | 32 | 104 | 112 | 124 | 17.6 (132) | 0.29 | 0.83 |
| 2E | 56 | 113 | 120 | 136 | 16.9 (127) | Crosslinked | Crosslinked |
| 2F | 270 | 88 | 100 | 113 | 16.0 (120) | 0.49 | 0.90 |
| 2G | 280 | 88 | 100 | 113 | 16.0 (120) | 0.30 | 0.91 |
| 2H | 290 | 88 | 100 | 113 | 16.0 (120) | 0.33 | 0.91 |
| 2I | 300 | 88 | 100 | 102 | 16.0 (120) | 0.14 | 0.75 |

Example 3

Continuous Synthesis of Poly(styrene-methacrylic acid/anhydride) Via the p-toluenesulfonic Acid Catalyzed Hydrolysis of PS-t-BMA, and Grafting of Amine Groups This example illustrates an ability to create libraries by: (1) varying the composition of the starting methacrylate (at a rate of 10.0 g/min). The residence time of the materials in the vacuum reactor was 35 minutes Samples were tested with Diffusion Ordered Spectroscopy and Infrared Spectroscopy. The results of the Diffusion Ordered Spectroscopy showed the remaining levels of TBMA and levels of PS in the reactor exit over time. These results are also shown in Table 5.

TABLE 5

| Sample | Time (min) | Vacuum kPa (torr) | $T_1$ °C. | $T_2$ °C. | $T_3$ °C. | Addition | TBMA Mole % In | TBMA Mole % Out | PS Mole % |
|---|---|---|---|---|---|---|---|---|---|
| 3G | 0 | 26.8 (201) | 128 | 171 | 166 | | 3.2 | 0.20 | 99.80 |
| 3H | 13 | 25.6 (192) | 127 | 171 | 171 | | 22.0 | 0.10 | 99.90 |
| 3I | 18 | 18.0 (135) | 127 | 172 | 169 | | | 0.30 | 99.69 |
| 3J | 28 | 18.4 (138) | 126 | 174 | 170 | Cyclohexylamine on | | 0.20 | 99.80 |
| 3K | 37 | 17.5 (131) | 128 | 174 | 172 | | | 0.20 | 99.80 |
| 3L | 49 | 26.7 (200) | 142 | 175 | 173 | Cyclohexylamine off | | 0.20 | 99.80 |
| 3M | 63 | 26.8 (201) | 146 | 176 | 174 | | 13.0 | 1.65 | 98.35 |
| 3N | 73 | 27.1 (203) | 135 | 177 | 176 | | 13.0 | 6.00 | 94.00 |
| 3O | 84 | 27.3 (205) | 132 | 176 | 176 | Butylamine on at 89 min. | 13.0 | 7.15 | 92.85 |
| 3P | 99 | 27.1 (203) | 135 | 181 | 178 | Butylamine off at 94 min. | 19.9 | 7.99 | 92.01 |
| 3Q | 117 | 24.9 (187) | 141 | 183 | 181 | Ethanolamine on at 110 min. | 19.9 | 5.51 | 94.49 |
| 3R | 124 | 26.9 (202) | 138 | 182 | 181 | Ethanolamine off at 133 min. | 19.9 | 2.27 | 97.73 |
| 3S | 143 | 20.8 (156) | 138 | 189 | 182 | | 33.4 | 0 | 100 |
| 3T | 153 | 11.7 (83) | 132 | 191 | 183 | | 33.4 | 2.26 | 97.74 |
| 3U | 172 | 6.5 (49) | 127 | 188 | 184 | | 33.4 | 0.51 | 99.42 |
| 3V | 196 | 7.5 (56) | 121 | 183 | 177 | | 33.4 | 6.38 | 93.62 |
| 3W | 206 | 7.7 (58) | 131 | 175 | 168 | | 33.4 | 12.07 | 87.93 |
| 3X | 225 | 12.1 (91) | 137 | 158 | 151 | | 33.4 | 15.67 | 84.33 |

The data in Table 5 indicates that by varying temperature and pressure in the process of the present invention, libraries of materials can be made. Results of Infrared Spectroscopy indicated characteristic bands for various functional groups. All samples displayed the characteristic frequencies for anhydride (1802 cm$^{-1}$ and 1760 cm$^{-1}$) and acid (1710 cm$^{-1}$ indicative of a carboxylic acid). Ester groups (1736 cm$^{-1}$ indicative of a carboxylic ester) were also noted.

Grafting of an amine on the acid or anhydride sites was seen after addition of cyclohexylamine. Sample 3M and 3N displayed new bands indicative of amide formation (about 1671 cm$^{-1}$) in addition to anhydride (1803 cm$^{-1}$ and 1760 cm$^{-1}$).

The relative anhydride concentration was quantitatively estimated by a ratio of the area under the pronounced anhydride band at 1802 cm$^{-1}$ with the area under the aromatic peak at 1600 cm$^{-1}$, which was assumed to be constant. The anhydride presence was seen to decrease with lower processing temperature. Similarly the relative ester concentration was quantitatively estimated by a ratio of the area under the pronounced ester band at 1736 cm$^{-1}$ with the area under the aromatic peak at 1600 cm$^{-1}$. The ester presence was seen to increase with lower processing temperature. Data is shown in Table 6.

TABLE 6

| Sample | Anhydride Ratio of 1802 cm$^{-1}$:1600 cm$^{-1}$ | Ester Ratio of 1740 cm$^{-1}$:1600 cm$^{-1}$ |
|---|---|---|
| 3U | 1.2 | 1.6 |
| 3X | 0.5 | 3.2 |

Various modifications and alterations that do not depart from the scope and spirit of this invention will become apparent to those skilled in the art. This invention is not to be unduly limited to the illustrative embodiments set forth herein.

We claim:

1. A continuous method of making a combinatorial library of materials comprising:

providing a plug flow mixing apparatus having a high shear environment and devolatilization capabilities, continuously introducing into the mixing apparatus a composition containing at least one polymer that can be modified by a thermally-induced reaction into the reactor, exposing the composition to a high shear environment, and introducing or changing over time at least one variable affecting the properties of the at least one polymer that can be modified to produce a combinatorial library of materials;

wherein the thermally-induced reaction removes at least one protective group to expose a functional group and wherein the functional group is ethylenically or acetylenically unsaturated.

2. The method of claim 1 wherein the composition is exposed to a temperature of about 100° C. to about 180° C. while it is exposed to a high shear environment.

3. The method of claim 1 further comprising evaluating the materials of the library.

4. The method of claim 1 wherein the composition when introduced into the apparatus comprises 90 weight % solids or less.

5. The method of claim 1 wherein the composition comprises at least one polymer that is temperature sensitive.

6. The method of claim 1 wherein the exposed functional group is capable of undergoing a grafting reaction.

7. The method of claim 1 wherein the thermally-induced reaction comprises the elimination of isobutylene and water from methacrylic and acrylic esters to produce one or both of acid and anhydride functionalities.

8. The method of claim 1 wherein the reaction is catalyzed.

9. The method of claim 1 wherein the reaction is acid-catalyzed.

10. The method of claim 1 wherein the thermally-induced reaction comprises the elimination of trialkylsilanes from trialkylsiloxy end or side group containing polymers to produce a library of hydroxyl end or side group functional polymers.

11. The method of claim 1 wherein the thermally-induced reaction comprises the elimination of trialkylsilanes from polymer end or side groups to produce a library of amino end or sidegroup functional polymers.

12. The method of claim 1 wherein the thermally-induced reaction comprises a deesterification reaction to produce a library of hydroxyl- or carboxylic acid-functionalized polymers.

13. The method of claim 12 wherein the reaction is base-catalyzed.

14. The method of claim 1 wherein the thermally-induced reaction comprises the elimination of $N_2$ from acyl azides and subsequent rearrangement to form isocyanate functionality.

15. The method of claim 1 wherein the thermally-induced reaction comprises the elimination of benzenesulfenic acid from poly(vinyl phenyl sulfoxide) to produce a library of polyacetylene-containing polymers.

16. The method of claim 1 wherein the thermally-induced reaction comprises the elimination of trialkylsilanes from trialkylsilthiane end or side group containing polymers to produce a library of thiol end or side group functional polymers.

17. The method of claim 1 wherein the thermally-induced reaction comprises the elimination of trialkylsilanes from trialkylsilyl-substituted ethynyl monomers, such as 2-,3- and 4-[(trimethylsilyl)-ethynyl]styrenes, to produce a library of ethynyl-containing side-group or end functionalized polymers.

18. The method of claim 1 further comprising an in situ chemical reaction at the functional group.

19. The method of claim 18 wherein the chemical reaction comprises forming a a library of graft polymer.

20. The method of claim 1 wherein the mixing apparatus comprises a high viscosity devolatilizer.

21. The method of claim 1 wherein the mixing apparatus is operated in series with one or more other continuous reactors.

22. The method of claim 1 wherein the variable is from the group consisting of concentration of starting material, type of starting material, pressure in the reactor, temperature profile in the reactor, amount of energy supplied to a reaction zone, type of energy supplied to a reaction zone, type of component mixing, degree of component mixing, residence time, type and amount of grafting agent, and where and when additional components are introduced into the plug flow reactor.

23. The method of claim 22 wherein the variables is one or both of the type of grafting agent and amount of grafting agent.

24. The method of claim 1 wherein the changing of a variable is performed in a continuous manner.

25. The method of claim 1 wherein the changing of a variable is performed in a stepwise manner.

* * * * *

UNITED STATES PATENT AND TRADEMARK OFFICE
CERTIFICATE OF CORRECTION

PATENT NO. : 7,157,283 B2  Page 1 of 2
APPLICATION NO. : 10/211219
DATED : January 2, 2007
INVENTOR(S) : James M. Nelson It is certified that error appears in the above-identified patent and that said Letters Patent is hereby corrected as shown below:

On the title page item (56), Page 2, Column 1:
Line 21, Delete ""Efectiveness" and insert -- "Effectiveness --, therefor.
Line 33, Delete "Fuctionalized" and insert -- Functionalized --, therefor.
Line 37, After "Methacrylic" insert -- Acid --.

On the title page item (56) Page 2, Column 2:
Line 24, Delete "Hydocarbon" and insert -- Hydrocarbon --, therefor.
Line 24, After "Studies" delete "fo" and insert -- of --, therefor.

Column 1:
Line 38, After "13)" insert -- , --.

Column 7:
Line 44, Delete "polymethacylic" and insert -- polymethacrylic--, therefor.

Column 12:
Line 18, Delete "polyactylene" and. insert-- polyacetylene--, therefor.

Column 15:
Line 45, Delete "disilacyclopentan" and insert -- disilacyclopentane. --, therefor.

Column 18:
Line 21, Delete "Infared" and insert -- Infrared --, therefor.
Line 24, Delete "IRμTS" and insert -- IRμS --, therefor.

Column 19:
Line 29, Delete "shaft)," and insert -- shaft). --, therefor.

Column 20:
Line 30, After "TABLE" delete "I" and insert -- 1 --, therefor.

Column 22:
Line 61, After "minutes" insert -- . --.

UNITED STATES PATENT AND TRADEMARK OFFICE
CERTIFICATE OF CORRECTION

PATENT NO. : 7,157,283 B2
APPLICATION NO. : 10/211219
DATED : January 2, 2007
INVENTOR(S) : James M. Nelson It is certified that error appears in the above-identified patent and that said Letters Patent is hereby corrected as shown below:

Column 26:
Line 4, In Claim 19, after "forming a" delete "a".

Signed and Sealed this

Fifteenth Day of May, 2007

JON W. DUDAS
*Director of the United States Patent and Trademark Office*